(12) United States Patent
Lehmann et al.

(10) Patent No.: US 9,342,618 B2
(45) Date of Patent: May 17, 2016

(54) WEB APPLICATION COMPOSITON AND MODIFICATION EDITOR

(75) Inventors: Doron Lehmann, Kfar Vradim (IL); Eyal Nathan, Tel-Aviv (IL); Nimrod Barak, Nes Tziona (IL)

(73) Assignee: SAP SE, Walldorf (DE)

( * ) Notice: Subject to any disclaimer, the term of this patent is extended or adjusted under 35 U.S.C. 154(b) by 502 days.

(21) Appl. No.: 13/487,744

(22) Filed: Jun. 4, 2012

(65) Prior Publication Data
US 2013/0326337 A1 Dec. 5, 2013

(51) Int. Cl.
*G06F 17/00* (2006.01)
*G06F 17/30* (2006.01)

(52) U.S. Cl.
CPC .................. *G06F 17/30905* (2013.01)

(58) Field of Classification Search
CPC ................ G06F 17/2247; G06F 17/30899
USPC ............. 715/234, 236, 200, 240, 243
See application file for complete search history.

(56) References Cited

U.S. PATENT DOCUMENTS

| | | | | |
|---|---|---|---|---|
| 6,031,989 A * | 2/2000 | Cordell | .......................... | 717/109 |
| 6,266,684 B1 * | 7/2001 | Kraus et al. | .................... | 715/209 |
| 6,593,944 B1 * | 7/2003 | Nicolas et al. | ................. | 715/744 |
| 6,711,714 B1 * | 3/2004 | Wynblatt et al. | ............... | 715/209 |
| 6,993,716 B2 * | 1/2006 | Palmieri | ......................... | 715/265 |
| 7,055,097 B1 * | 5/2006 | Netsch | ........................... | 715/207 |
| 7,895,522 B2 * | 2/2011 | Wong et al. | ..................... | 715/746 |
| 8,176,416 B1 * | 5/2012 | Williams et al. | ............... | 715/243 |
| 2004/0100509 A1 * | 5/2004 | Sommerer | ........ | G06F 17/30905 715/864 |
| 2004/0117735 A1 * | 6/2004 | Breen | ........................... | 715/517 |
| 2005/0138571 A1 * | 6/2005 | Keskar et al. | .................. | 715/789 |
| 2005/0216858 A1 * | 9/2005 | Fabritius | ........................ | 715/802 |
| 2006/0117269 A1 * | 6/2006 | Lai et al. | ........................ | 715/781 |
| 2006/0184639 A1 * | 8/2006 | Chua et al. | ..................... | 709/217 |
| 2007/0180362 A1 * | 8/2007 | Hunt et al. | ..................... | 715/517 |
| 2010/0257196 A1 * | 10/2010 | Waters et al. | ................. | 707/769 |
| 2014/0006934 A1 * | 1/2014 | Wang et al. | ..................... | 715/235 |
| 2014/0289640 A1 * | 9/2014 | Poornachandran | ... | G06F 17/212 715/745 |

* cited by examiner

*Primary Examiner* — Manglesh M Patel
(74) *Attorney, Agent, or Firm* — Buckley, Maschoff & Talwalkar LLC

(57) ABSTRACT

According to some embodiments, a method and apparatus are provided to receive a request to view a web page from a mobile device, determine characteristics associated with the user, select a web page layout based on the determined characteristics, and provide the web page based on the selected web page layout to the mobile device.

14 Claims, 7 Drawing Sheets

100

Receive a request to view a web page from a user
101

Determine characteristics associated with the user
102

Select a web page layout variant based on the determined characteristics
103

Provide the web page based on the selected web page layout variant to the mobile device
104

FIG. 1

| Variant 702 | Device Type 704 | Location 706 | Installed Equipment 708 |
|---|---|---|---|
| 3 | Android | IL | - |
| 4 | Iphone | US | GPS |
| 5 | Smartphone | CN | - |

FIG. 7

WEB APPLICATION COMPOSITON AND MODIFICATION EDITOR

BACKGROUND

A web portal is a web site that combines information from a variety of different sources in a single web page. Typically, each information source is associated with a dedicated area on a web portal for displaying information and each dedicated area may be associated with a web browser frame.

Many users view web pages via a mobile device (e.g., tablet or smartphone). However, viewing and interacting with a web page portal that includes a variety of web browser frames can be difficult to view on a mobile device. Furthermore, a user may need to view the same web portal content on a mobile device as on a non-mobile device (e.g., a desktop computer). When viewing the same web portal on a mobile device that is normally viewed on a non-mobile device, a user may need to scroll up/down or right/left on their mobile device to view pertinent information. Not only does this make viewing a web portal difficult, but also time consuming.

BRIEF DESCRIPTION OF THE DRAWINGS

FIG. 1 illustrates a method according to some embodiments.

FIG. 7 illustrates a portion of a database that might be stored in accordance with some embodiments.

DETAILED DESCRIPTION

Figure 2:
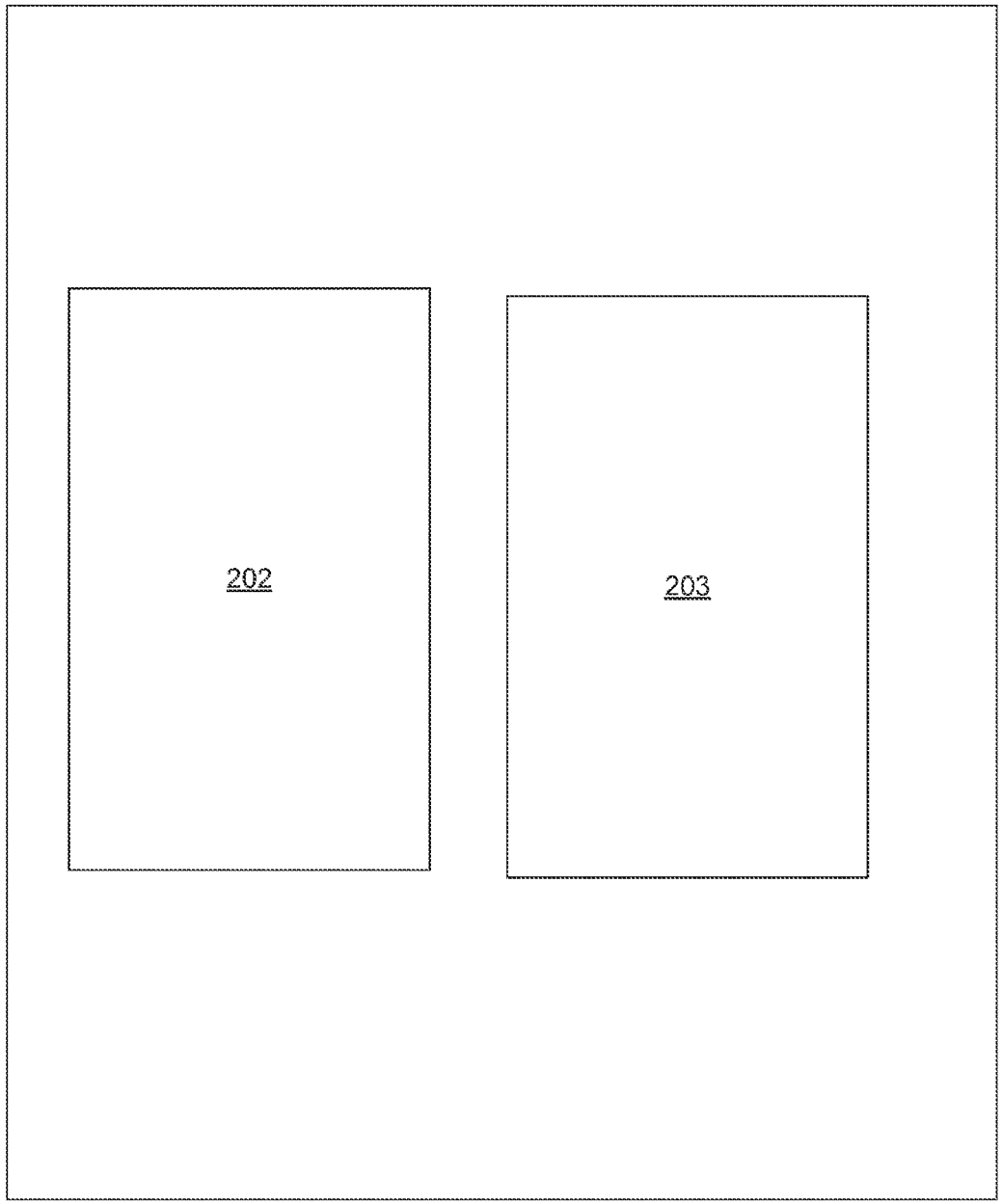
FIG. 2 illustrates a web portal according to some embodiments.

In some embodiments, a web browser frame may comprise an iView. An iView may be defined as any kind of application, information or service that can be visualized in a Web browser frame. iViews may comprise self-contained web documents that are provided via a Uniform Resource Locator (URL) and are managed by a web portal framework. An iView may lead directly to a website but an iView offers some content to users to fulfill its reason for purpose within its allotted space in the web browser frame. iViews may be linked such that when making a change in a first iView, content in a second iView may be changed based on the change in the first iView.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 4. The method 100 may relate to managing a plurality of web page layout variants (e.g., different layouts) being viewed via a mobile device. By managing a plurality of different layouts, a web server may not need to store specific web pages for specific devices which may take up extra disk space as well as require developers to have to modify each web page whenever a change is required. By simply using a variant of layouts, developers may only need to change a single web page.

At 101, a request to view a web page is received from a mobile device. The request may be received at a web server. The web page may comprise a web portal, such as, but not limited to, a web portal comprising one or more iViews.

Next, at 102, characteristics associated with the mobile device are determined. In some embodiments, determining comprises determining a type of mobile device being used or a location of the mobile device. Furthermore, in some embodiments determining may also comprise determining the mobile device's screen resolution and/or a specific component that is installed within the mobile device (e.g., a global positioning system ("GPS"), a camera, etc.).

Determining characteristics associated with the mobile device may be accomplished by a media query which may return a screen resolution of the device accessing the portal or other characteristics associated with the mobile device such as a type of mobile device (e.g., iPhone based, Android based). Media queries may be associated with a cascading style sheet ("CSS") such as CSS3.

The physical location of the mobile device may also be considered a characteristic. Therefore, the mobile device, by using a built in GPS, a location indication received via a cell tower, a WIFI address, and/or via a geolocation html tag, may be able to determine a location of the mobile device and this location may be received by the web server. For example, the location of the mobile device may be sent as part of a network packet from the mobile device to the web server.

At 103, a web page layout variant is selected based on the determined characteristics. Once the characteristics are determined, the webserver, using a set of rules, may select a variant of a page layout based on the characteristics associated with the mobile device. The rules may be implemented in a CSS. In some embodiments the selection of a web page layout variant may also be associated with a role of the user who requests the web page.

Selection of a web page layout variant may be based on a CSS associated with the web page. CSS may be used for describing a look and format of a document written in a language such as, but not limited to, HTML or XML. CSS may enable the separation of a document's content from document presentation, including elements such as the layout of the document. By selecting a web page layout variant of a web page via the CSS, an application that controls the web page is not affected since the CSS is a layer above the application and the CSS determines what to show based on the characteristics of the mobile device. For example, the CSS associated with a web page may determine a particular variant of the web page to be displayed based on a determined screen resolution, a type of mobile device and/or a location of the mobile device.

The set of rules may relate to specific web page layout variants to be used based on the determined characteristics. Such rules may be created as conditional statements such as "if/then/else" statements that may facilitate administration of logical operators for each condition. For example, IF the mobile device EQUALS a smartphone THEN page varient number 3 will be used (e.g., page variant=3), IF smartphone type EQUALS iPhone THEN page variant number 4 will be used, IF country EQUALS USA THEN page variant number 5 will be used, IF device capability CONTAINS GPS THEN page variant number 6 will be used ELSE page varient number 5 will be used. The aforementioned example rules may be created using an editor such as the editor described with respect to FIG. 5. At 104, the web page based on the selected web page layout variant is provided to the mobile device.

In one embodiment, each respective web page layout variant may comprise the same elements as other web page layout variants except that the elements of the web page may have been rearranged or repositioned. For example, elements of most importance to a user may be moved to an area of the web page most easily viewed on a mobile device. Likewise, elements of least importance may be moved to area of the web page that may require a user of the mobile device to scroll (e.g., down or sideways) to view the elements of least importance. The determination of the placement of specific elements may be based, at least, on screen resolution of the mobile device as well a role of the user.

In another embodiment, each respective web page layout variant may comprise one or more of the same elements as other web page layout variants except that the elements have be rearranged or repositioned. Furthermore, in this embodiment web page layout variants may also include additional specific elements associated with the user based on a role of the user. The positioning of the elements may be based on a screen resolution of the mobile device and an importance of the element to the user.

For illustrative purposes, and to aid in understanding features of the specification, some examples will now be introduced. These examples are not intended to limit the scope of the claims. In a first example, and now referring to FIG. 2, a user views a web portal 200 that comprises iViews 202 and 203. In some embodiments, FIG. 2 illustrates the web portal 200 as viewed on a desktop or laptop computer. However, the user may want to view the web portal 200 on a mobile device such as a smartphone or a tablet. A computing system hosting the portal (e.g., a portal framework system) may query the mobile device to determine characteristics associated with the mobile device.

Figure 3:
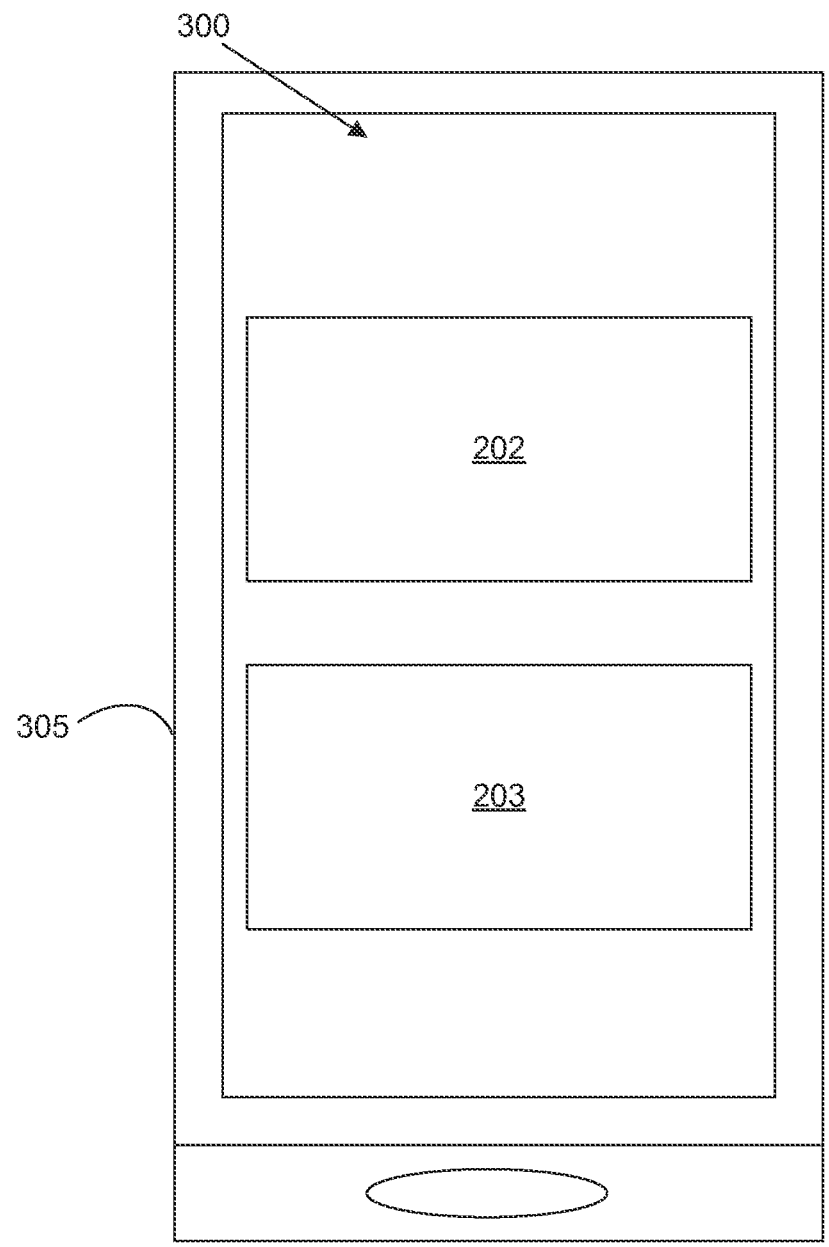
FIG. 3 illustrates a web portal viewed on a mobile device according to some embodiments.

Now referring to FIG. 3, an embodiment of a web portal variant 300 that may be viewed on a mobile device 305 is illustrated. Once the characteristics of the mobile device are determined, a page variant is selected for the mobile device based on the characteristics. For example, the page variant in the present embodiment may align the iViews 202 and 203 one above the other instead of side by side as illustrated in FIG. 2.

In a second example, a location characteristic associated with the mobile device may be determined. For example, a determination of a country in which the mobile device is located may be transmitted to a web server. Given this location characteristic, a web page layout variant associated with the determined country may be used for the web page. In such an example, if the determined country is "Israel" then location of iViews on a web portal that associated with Israel may be repositioned so that a mobile user would not have to scroll to view the iViews associated with Israel.

In a third example, a component of the mobile device is determined (e.g., a GPS). In response to determining a specific component (e.g., a GPS or a camera) of the mobile device, then web page layout variant associated with a GPS or the camera may be repositioned on a web page.

Figure 4:
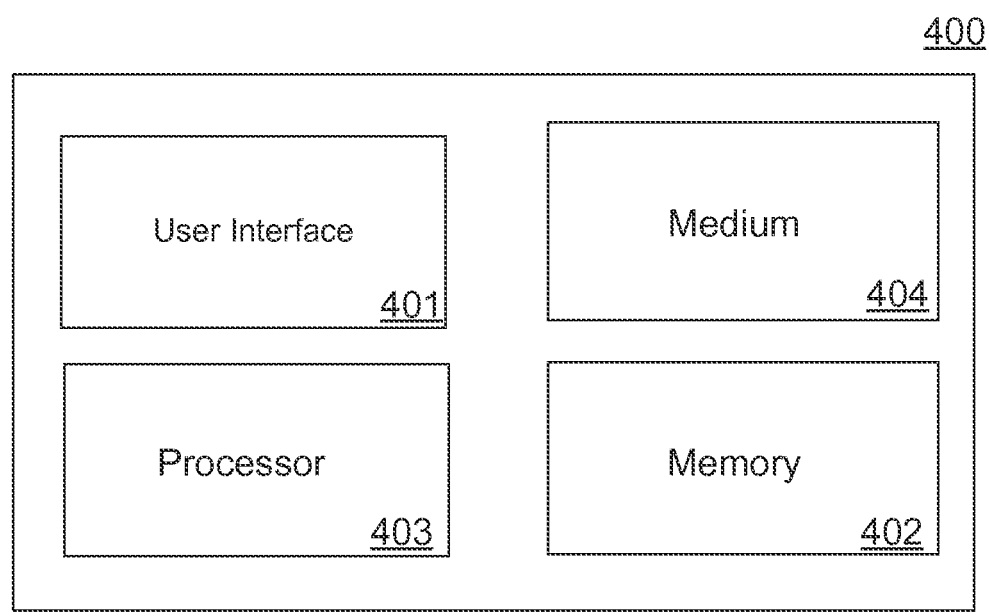
FIG. 4 illustrates a computing system according to some embodiments.

Now referring to FIG. 4, an embodiment of an apparatus 400 is illustrated. The apparatus 400 may comprise a user interface 401, a main memory 402, a processor 403, and a medium 404. According to some embodiments, the apparatus 400 may further comprise a digital display port, such as a port adapted to be coupled to a digital computer monitor, television, portable display screen, or the like.

The user interface 401 may allow users to interact with the apparatus 400 using text commands or with images/graphical icons. In some embodiments, the user interface may comprise a keyboard, mouse, or associated port related thereto. Furthermore, the user interface 401 may comprise a display or a touch screen.

The main memory 402 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 402 may comprise a plurality of memory modules.

The processor 403 may include or otherwise be associated with dedicated registers, stacks, queues, etc. that are used to execute program code and/or one or more of these elements may be shared there between. In some embodiments, the processor 403 may comprise an integrated circuit. In some embodiments, the processor 403 may comprise circuitry to perform a method such as, but not limited to, the method described with respect to FIG. 1.

The medium 404 may comprise any computer-readable medium that may store processor-executable instructions to be executed by the processor 403. For example, the medium 404 may comprise a non-transitory tangible medium such as, but is not limited to, a compact disk, a digital video disk, flash memory, optical storage, random access memory, read only memory, or magnetic media.

Figure 5:
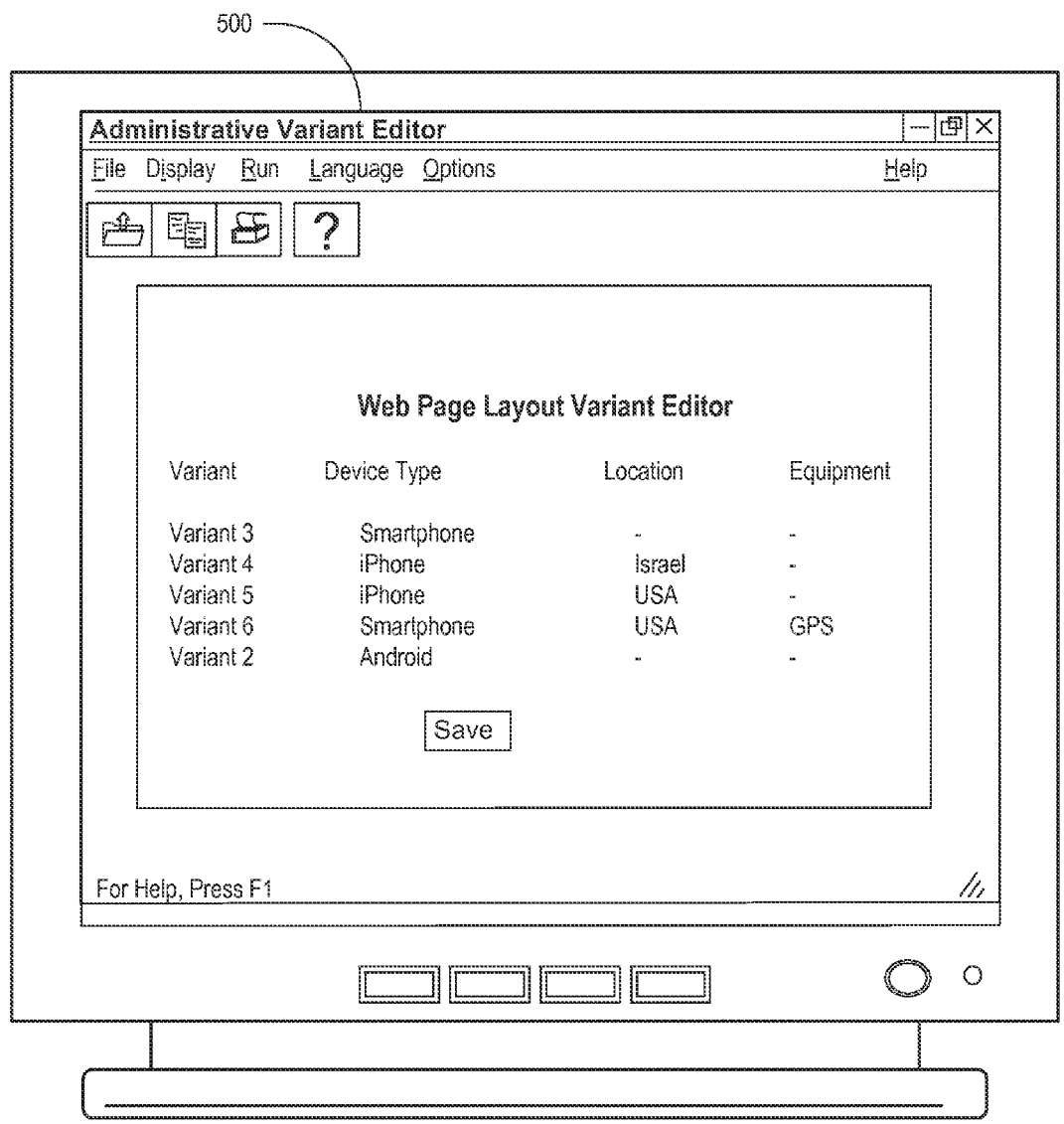
FIG. 5 illustrates an editor according to some embodiments.

FIG. 5 illustrates an editor 500 according to some embodiments. The editor 500 may facilitate an administrator entering and/or adjusting rules and/or content priorities associated with a plurality of web page layouts. For example, an editor may provide a visual page editor that will let an administrator define rules associated with variants of a web pay layout to define a way in which text, portals, and/or pictures are set out on a web page.

The editor may assign different variants of a web page layout and associate these layouts with specific characteristics (e.g., smartphone, tablet, desktop, location, specific roles in the portal). Each web page layout may be associated with one or more particular characteristics of a mobile device. The editor may enable a layer of styling and rules on top of an application so that a web portal may be used for different platforms or for different runtime scenarios without having to create specific portal pages for each type of device. Furthermore, the editor 500 may comprise a graphical editor to allow a user to apply rules regarding the characteristics of a mobile device. The rules may be based on CSS properties such as Media Queries or on user role based rules (e.g., a manager role, a non-manager role) to vary a layout of a web page based on determined characteristics of a mobile device.

Figure 6:
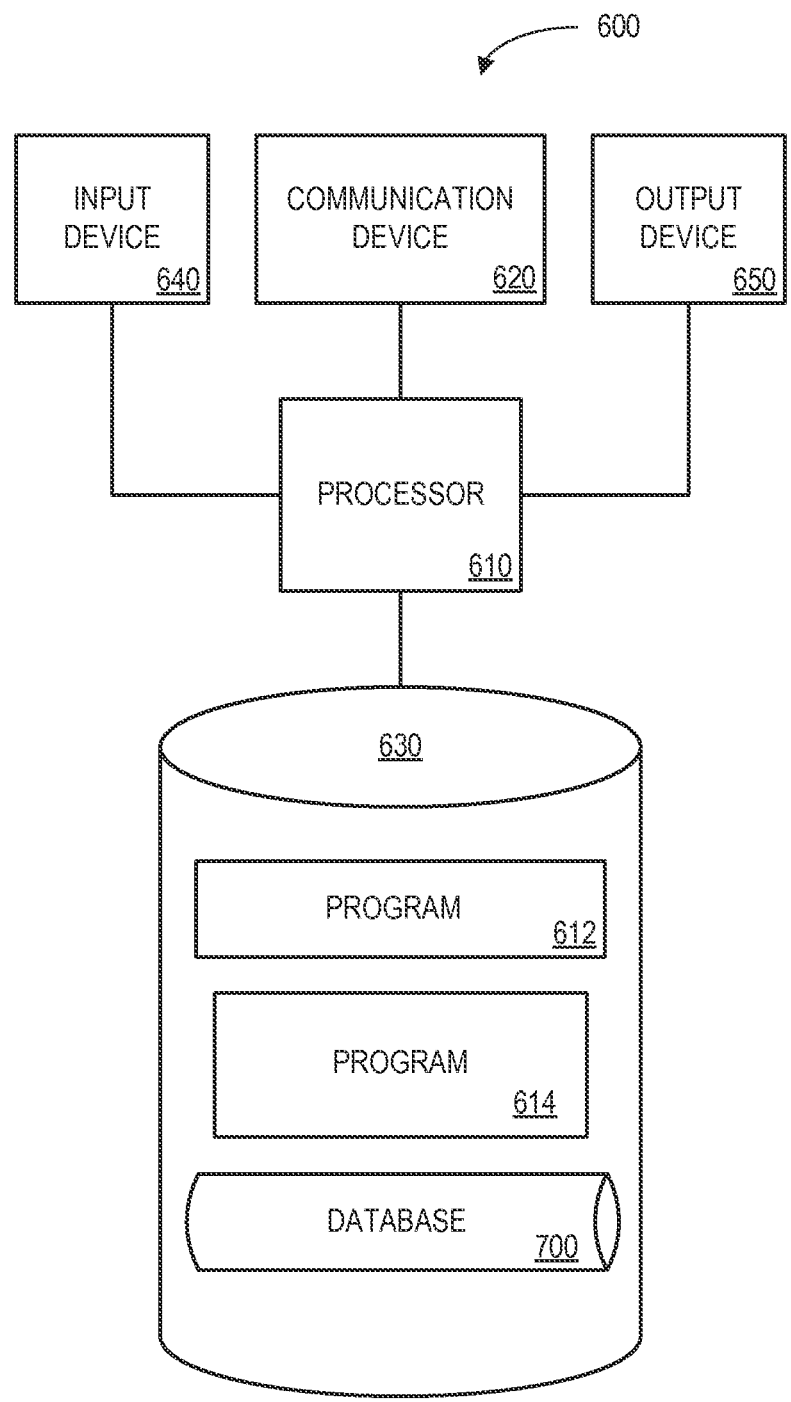
FIG. 6 is a block diagram of an apparatus according to some embodiments.

Now referring to FIG. 6, FIG. 6 is a block diagram overview of an apparatus 600 according to some embodiments. The apparatus 600 may be, for example, associated with a mobile device, such as a phone or tablet. The apparatus 600 comprises a processor 610, such as one or more commercially available Central Processing Units (CPUs) in the form of one-chip microprocessors, coupled to a communication device 620 configured to communicate via a communication network (not shown in FIG. 6). The communication device 620 may be used, for example, as an input path to receive information about user roles. The apparatus 600 further includes an input device 640 (e.g., a touchscreen for navigation of a web page) and an output device 650 (e.g., a touchscreen to display the web page).

The processor 610 communicates with a storage device 630. The storage device 630 may comprise any appropriate information storage device, including combinations of magnetic storage devices (e.g., a hard disk drive), optical storage devices, and/or semiconductor memory devices. The storage device 630 stores a program 612 and/or navigation platform 614 for controlling the processor 610. The processor 610 performs instructions of the programs 612, 614, and thereby operates in accordance with any of the embodiments described herein. For example, the processor 610 may determine a screen resolution of the apparatus 600.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the apparatus 600 from another device; or (ii) a software application or module within the apparatus 600 from another software application, module, or any other source.

In some embodiments (such as shown in FIG. 6), the storage device 630 stores a database 700 (e.g., including information associated with the mobile device). An example of a database that may be used in connection with the apparatus 600 will now be described in detail with respect to FIG. 7. Note that the database described herein is only an example, and additional and/or different information may be stored therein. Moreover, various databases might be split or combined in accordance with any of the embodiments described herein.

Referring to FIG. 7, a table is shown that represents the database 700 that may be stored locally at the apparatus 600 according to some embodiments or at a web server, such as apparatus 400, according to other embodiments. The table may include, for example, entries identifying information about font sizes and distances. The table may also define fields 702, 704, 706 and 708 for each of the entries. The fields 702, 704, 706 and 708, may, according to some embodiments, specify: a web page layout variant identification 702, a device type 704, a location 706 and installed equipment 708. The information in the database 700 may be created and updated, for example, based on data received from a mobile device.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, may be stored on a tangible, machine readable medium and supplied to various customers or manufacturing facilities to load into the fabrication machines that actually make the logic or processor.

Various modifications and changes may be made to the foregoing embodiments without departing from the broader spirit and scope set forth in the appended claims. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

What is claimed is:

1. A method comprising:
   receiving a request from a mobile device to view a web page that comprises a plurality of iViews;
   determining, via a processor, a characteristic associated with the mobile device and a screen resolution of the mobile device;
   creating, based on a cascading style sheet, a web page layout variant comprising the plurality of iViews, by (i) repositioning iViews of most importance to a user of the mobile device, based on the screen resolution of the mobile device and an importance of each of the plurality of iViews to the user, to an area of the web page most easily viewed on the mobile device wherein the iViews of most importance are associated with the characteristic and (ii) repositioning iViews of least importance, based on the screen resolution of the mobile device and the importance of each of the plurality of iViews to the user, to an area of the web page that requires the user of the mobile device to scroll to view the iViews of least importance; and
   providing the web page based on the web page layout variant to the mobile device.

2. The method of claim 1, wherein the characteristic comprises:
   a type of mobile device.

3. The method of claim 1, wherein the characteristic comprises:
   a component of the mobile device.

4. The method of claim 1, wherein the characteristic comprises:
   a country where the mobile device is currently located.

5. The method of claim 1, wherein the characteristic comprises a geographical area in which the mobile device is located and one or more of the plurality of iViews associated with the geographical area comprise the iViews of most importance.

6. The method of claim 1, wherein the web page layout variant is further based on a role of the user of the mobile device.

7. A non-transitory computer-readable medium comprising instructions that when executed by a processor perform a method, the method comprising:
   receiving a request from a mobile device to view a web page that comprises a plurality of iViews;
   determining, via a processor, a characteristic associated with the mobile device and a screen resolution of the mobile device;
   creating, based on a cascading style sheet, a web page layout variant comprising the plurality of iViews, by (i) repositioning iViews of most importance to a user of the mobile device, based on the screen resolution of the mobile device and an importance of each of the plurality of iViews to the user, to an area of the web page most easily viewed on the mobile device wherein the iViews of most importance are associated with the characteristic and (ii) repositioning iViews of least importance, based on the screen resolution of the mobile device and the importance of each of the plurality of iViews to the user, to an area of the web page that requires the user of the mobile device to scroll to view the iViews of least importance; and providing the web page based on the web page layout variant to the mobile device.

8. The medium of claim 7, wherein the characteristic comprises:
a type of mobile device.

9. The medium of claim 7, wherein the characteristic comprises:
a component of the mobile device.

10. The medium of claim 7, wherein the characteristic comprises:
a country where the mobile device is currently located.

11. An apparatus comprising:
a processor;
a non-transitory computer-readable medium comprising instructions that when executed by the processor perform a method, the method comprising:
receiving a request from a mobile device to view a web page that comprises a plurality of iViews;
determining, via the processor, a characteristic associated with the mobile device and a screen resolution of the mobile device;
creating, based on a cascading style sheet, a web page layout variant comprising the plurality of iViews, by (i) repositioning iViews of most importance to a user of the mobile device, based on the screen resolution of the mobile device and an importance of each of the plurality of iViews to the user, to an area of the web page most easily viewed on the mobile device wherein the iViews of most importance are associated with the characteristic and (ii) repositioning iViews of least importance, based on the screen resolution of the mobile device and the importance of each of the plurality of iViews to the user, to an area of the web page that requires the user of the mobile device to scroll to view the iViews of least importance; and providing the web page based on the web page layout variant to the mobile device.

12. The apparatus of claim 11, wherein the characteristic comprises:
a type of mobile device.

13. The apparatus of claim 11, wherein the characteristic comprises:
a component of the mobile device.

14. The apparatus of claim 11, wherein the characteristic comprises:
a country where the mobile device is currently located.

* * * * *